Nov. 23, 1965 P. HOPP 3,218,748

SHOPPING CART REMOVABLE SIGN

Filed Oct. 10, 1963

INVENTOR.
PHILIP HOPP

BY
Kane, Dalsimer & Kane
ATTORNEYS

United States Patent Office 3,218,748
Patented Nov. 23, 1965

3,218,748
SHOPPING CART REMOVABLE SIGN
Philip Hopp, New York, N.Y., assignor to The Hopp Press Incorporated, New York, N.Y., a corporation of New York
Filed Oct. 10, 1963, Ser. No. 315,140
1 Claim. (Cl. 40—308)

This invention relates generally to removable signs and more particularly to a removable sign specifically designed for removable attachment to the tubular handle of a shopping cart.

Today shopping carts are used in supermarkets and in many other stores where merchandise is displayed on open counters for self-service by the customer. The customer procures a cart upon arrival at the store and uses the cart while he is in the store, pushing the same around and placing therein such items as he has determined he will purchase. Upon completion of his selections the customer goes to a check out counter where an employee of the store reviews the items to be purchased, indicates the cost thereof, receives the customer's purchase money, packages the items and the customer then takes the items either in his arms to the door under which circumstances the cart is left inside the store for another customer, or the customer pushes the cart outside of the store into an adjacent parking lot and loads the articles purchased from the cart into the customer's car. The cart is then left outside or moved to the side and left with other carts.

Several problems arise with such a method of merchandising, one of these being the difficulty some customers have in knowing where the cart should be left after they are finished with it in the store. Also, there is a problem of some persons taking carts that should be left inside and bringing them outside and leaving them there.

Because of the construction of the shopping cart and the use thereof it has been found desirable to place signs or tags on the shopping cart in order to advise the customer of where the cart should be left when he is finished with it and also to advise the customer of special sales on that day. It is desirable that flexibility be maintained, however, and to permanently attach a sign or marker to a shopping cart would not be desirable.

It is a principal object of this invention, therefore, to provide an easily removable, inexpensive attachment to a shopping cart which when not in use is easily stored and which when in use will not interfere with the use of the shopping cart itself.

It is a further object of this invention to provide an item which though easily removed gives the appearance of being permanently attached so one not aware of its use would be less inclined to attempt to remove it.

A shopping cart removable sign constructed in accordance with the teachings of this invention and the manner of using the same is described herein with reference to the drawings in which.

Figure 1:
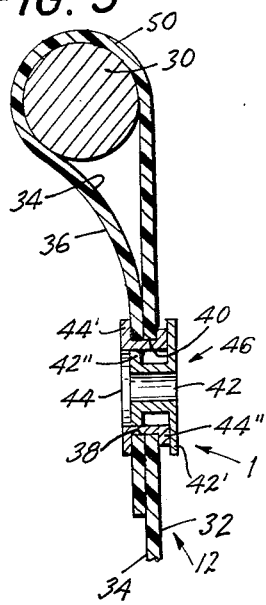
FIG. 1 is a side view of a shopping cart with a removable sign constructed in accordance with the teachings of this invention attached thereto.
Figure 2:
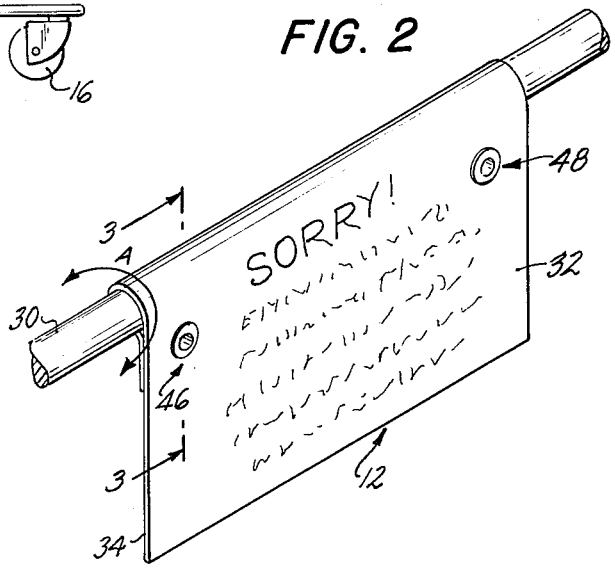
FIG. 2 is a front perspective view of the sign.

A shopping cart is shown in FIG. 1 and indicated generally by the numeral 10 with a removable sign constructed in accordance with the teachings of this invention attached thereto and indicated generally by the numeral 12. The shopping cart is the usual shopping cart having rear wheels 14, only one of which is shown, and front wheels 16, only one of which is shown, connected together to provide an underlying base with a tubular peripheral member indicated by the numeral 18. The remainder of the cart is supported by tubular members such as 20 and 22, and in the cart shown in FIG. 1 a basket 24 is shown supported by the tubular members slightly above the wheels. An upper basket 26 is supported by the tubular members 20 and 22 and this basket, although shown on a side view in FIG. 1, is generally rectangular. A handle portion 28, also tubular, is shown in FIG. 1 and it is to the handle portion that the sign is attached. A horizontal section 30 of the handle portion supports the sign and the supporting portion of horizontal section 30 is shown in FIG. 2 with sign 12 attached thereto. Sign 12 is a substantially rectangular member formed of a heavy or thick plastic with an outer face 32 which faces away from the cart and an inner face 34 which faces the cart.

Figure 3:
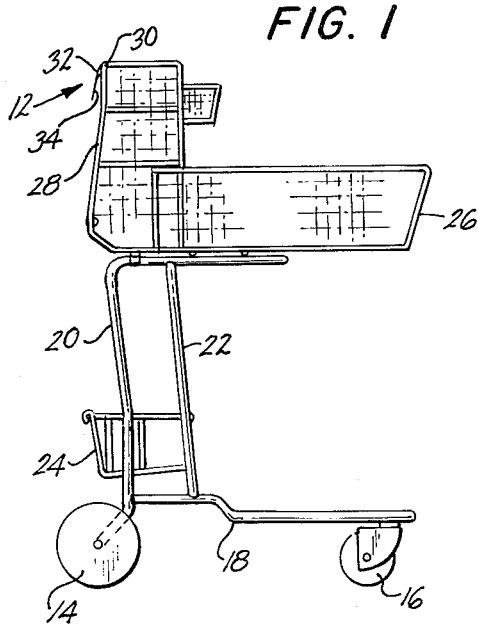
FIG. 3 is a partially sectional view taken along the line 3—3 in the direction of the arrows as shown in FIG. 2.

As seen in FIG. 3, portion 36 of sign 12 is disposed about tubular section 30 and the surface 34 of portion 36 is disposed adjacent face 34 of the remaining part of sign 12. Circular openings 38 and 40 are provided in portion 36 and the remainder of the sign as seen in FIG. 3 having the same central axis. Like openings are provided at the other end of the sign in a plane with the plane of the axis of openings 38 and 40 which is substantially parallel to the plane of the axis of tubular section 30. Snap members 42 and 44 are provided forming snap 46. A like snap indicated by the numeral 48 is provided at the other end of the sign. Snap 48 is formed of snap members identical to snap members 42 and 44. Snap member 42 is a cylindrical member of resilient material having a flange portion 42' and an outwardly turned portion 42" spaced therefrom.

Snap member 44 is substantially identical with snap member 42 having a cylindrical portion and a peripheral flange 44' and an outwardly turned portion 44". The outside diameter of the outwardly turned portion 42" of snap member 42, has a dimension less than the inside diameter of the cylindrical portion of member 44 so that the cylindrical portion of member 42 can telescope within the cylindrical portion of member 44. When the cylindrical portion of snap member 42 is telescoped within the cylindrical portion of snap member 44 the out turned portion 42" of member 42 is forced against the inside surface of the cylindrical portion of snap member 44 in a press fit and the members 42 and 44 can telescope only because the members are resilient. As shown in FIG. 3 and described herein, both members 42 and 44 are resilient. However, it would be sufficient for certain applications for one of the members to be formed of a resilient material.

Thus, snap 46 is provided having component parts 42 and 44 each supported by a different portion of sign 12 in such a way that they can telescope one within the other to be maintained in a tight force fit and can be freed only upon the use of a force by the person desiring to separate the same. It is noted that openings 40 and 38 supporting the snap members 44 and 42, respectively, are positioned so that upon the engagement of the snap members one with the other a cylinder 50 is formed of a portion of sign 12 within which tubular section 30 fits allowing the sign freedom of movement about the axis of tubular section 30 in the direction as shown by the double headed arrow A in FIG. 2. This allows the sign to rotate freely about the handle of the shopping cart.

It is seen, therefore, that a shopping cart removable sign is provided which can be made easily of plastic and imprinted with suitable indicia or language or information, and one whch can be easily removed or attached and which will not interfere with the normal use of the shopping cart.

Thus, among others, the several objects in the invention, as specifically aforenoted, are achieved. Obviously, numerous changes in construction and rearrangement of parts might be restored to without departing from the spirit of the invention as defined by the claim.

I claim:

A sign to be removably attached to the tubular handle of a shopping cart comprising a rectangular member formed of a stiff plastic material, a section of said member folded upon itself, a cylinder provided by said rectangular member with said section so folded, said cylinder receiving said tubular handle therein, first and second snap means, first and second openings in said plastic material receiving said first and second snap means respectively and supporting the same in a plane parallel to the plane of the central longitudinal axis of said cylinder to provide said cylinder with an inside diameter greater than the outside diameter of the tubular handle so that the sign is free to rotate about said tubular handle as an axis, each of said snap means including first and second hollow tubular snap members, a flange at one end of each of said snap members and a turned out portion at the remaining end of each of said snap members, being constructed whereby the turned out portion of said first snap member can be resiliently received within the tubular body of said second snap member.

References Cited by the Examiner

UNITED STATES PATENTS

| | | | |
|---|---|---|---|
| 562,060 | 6/1896 | Young | 24—107 |
| 1,682,106 | 8/1928 | Banks | 40—322 |
| 1,932,890 | 10/1933 | Grondahl | 40—308 |
| 2,654,927 | 10/1953 | Tansman | 24—107 X |
| 2,791,049 | 5/1957 | Berger et al. | 40—308 |
| 2,888,761 | 6/1959 | Miller | 40—308 |
| 2,932,105 | 4/1960 | Hawk et al. | 40—308 |

EUGENE R. CAPOZIO, *Primary Examiner.*

LAWRENCE CHARLES, *Examiner.*

JOHN W. WILL, *Assistant Examiner.*